Figure 1:
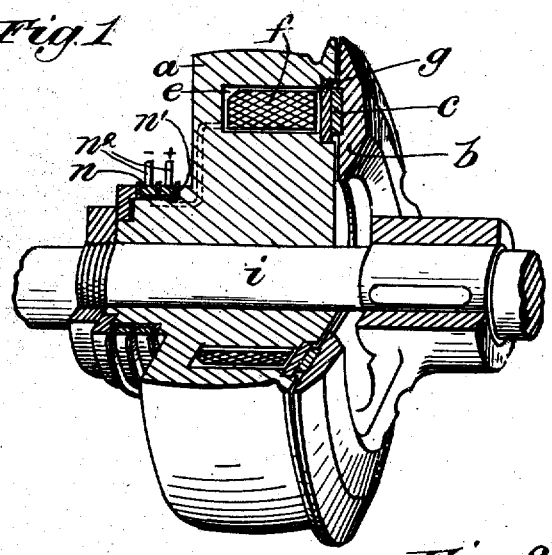

No. 12,581. REISSUED DEC. 18, 1906.

W. SCHUSTER & H. AST.

ELECTROMAGNETIC FRICTION CLUTCH.

APPLICATION FILED NOV. 22, 1906.

Witnesses.
Robt Everett.
C. D. Kesler

Inventors.
Wenzel Schuster.
Heinrich Ast.
By James L. Norris.
Atty.

UNITED STATES PATENT OFFICE.

WENZEL SCHUSTER AND HEINRICH AST, OF VIENNA, AUSTRIA-HUNGARY.

ELECTROMAGNETIC FRICTION-CLUTCH.

No. 12,581. Specification of Reissued Letters Patent. Reissued Dec. 18, 1906.

Original No. 736,789, dated August 18, 1903. Application for reissue filed November 22, 1906. Serial No. 344,653.

*To all whom it may concern:*

Be it known that we, WENZEL SCHUSTER and HEINRICH AST, subjects of the Emperor of Austria-Hungary, residing at Vienna, Austria-Hungary, have invented certain new and useful Improvements in Electromagnetic Friction-Clutches, of which the following is a specification.

This invention relates to electromagnetic clutches designed for the transmission of motive power through the medium of shafting and also for driving machine-tools, vehicles, hoisting-engines, switching and braking apparatus, and the like, and which are especially designed for use in all cases where rapid, smooth, and certain engagement and disengagement are to be effected and where repeated changes in the direction of rotation of the speed of the driven member are required.

The clutch of the present invention comprises generally a driving and a driven member of very simple construction, one of which members—usually the driving member—is fashioned as or is combined with an annular magnet. Two mutually-attractive elements are so arranged that the magnetic surfaces are separated by an air-gap, while the frictional surfaces, by means of which the driving is wholly effected, are of non-magnetic material and receive the whole pressure produced by the magnetic attraction between the magnetic surfaces. By this arrangement cohesion of the mutually-attractive elements due to residual magnetism is obviated, and by the selection of suitable material the wear and tear between the parts and frictional contact are minimized. In cases where pronounced changes in the speed and in the direction of rotation occur it is preferred that the driven member should be as light as possible and devoid of accessory parts and that the annular magnet should be arranged within or secured to the driving member, which maintains uniform speed. Instead of employing two frictional surfaces of non-magnetic material only one may be employed, which may be arranged either in the driving or in the driven member. Without increasing the cross-sectional area of the magnet and increasing thereby the weight of the clutch the contacting surface of the annular magnet may be enlarged in order as far as possible to make this surface equal in area to the attracting-surface of the armature and also to reduce the magnetic resistance of the air-gap. If preferred, a plurality of annular magnets or friction-surfaces may be employed and arranged concentrically.

With the above and other objects in view, as will appear as the nature of the invention is better understood, the same consists in the novel construction and combination of parts of an electromagnetic friction-clutch, as will be hereinafter fully described and claimed.

In the accompanying drawings, forming a part of this specification, and in which like letters of reference indicate corresponding parts, there are illustrated two forms of embodiment of the invention capable of carrying the same into practical operation, it being understood that the elements therein exhibited may be varied as to shape, proportion, and exact manner of assemblage without departing from the spirit thereof, and in these drawings—

Figure 3:
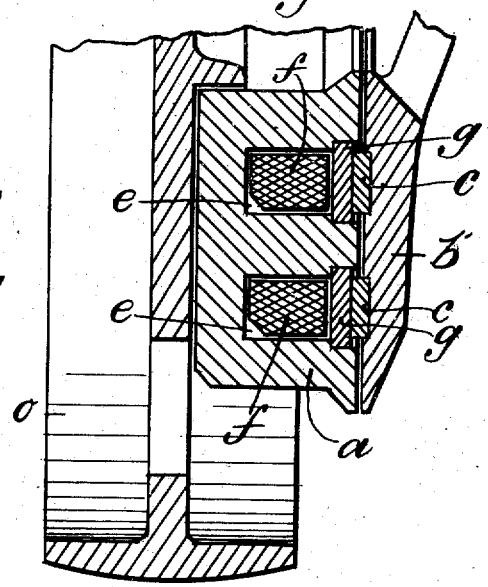
Figure 2:
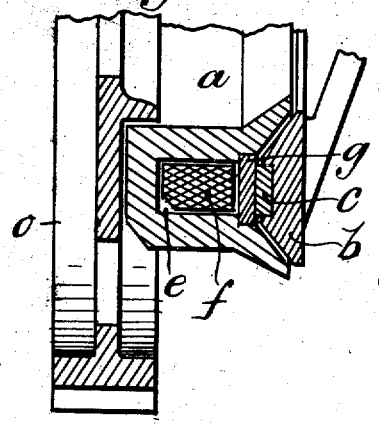

Figure 1 is a view in perspective, partly in section, of a clutch constructed in accordance with the present invention. Figs. 2 and 3 are sectional detail views of slightly-modified forms of parts of the invention.

Referring to the drawings and to Fig. 1 thereof, *b* designates the armature-ring constituting the driven member, which is suitably keyed to the shaft *i*, and in the armature-ring is fitted a friction-ring *c*, of non-magnetic material, secured in position in any suitable manner, the friction-ring *c* constituting a friction-surface. The driving member *a*, which in this form of embodiment of the invention is exhibited as a belt-sheave, comprises a bell-magnet, and housed in its annular recess *e* is a helix *f*. Carried by the magnet is a friction-ring *g*, the thickness of the two frictional rings *c* and *g* being so proportioned that upon closing the circuit the force of attraction between the magnet and the armature presses the ring *c* against the ring *g*; but there always remains an air-gap between the armature and the magnet, thus to keep these parts from actual contact. The opposed faces of the friction-rings are disposed perpendicular to the axis of the driving member, and the attracting-surfaces are conical. So long as the armature is magnetized the clutch will be operative for the function designed; but as soon as the current is switched the friction-rings become disconnected, as the residual magnetism has no effect to hold the parts in contact with each other.

The windings of the helix are connected to commutators $n$ $n'$, disposed in channels on the nave of the driving member, said commutators being insulated from the nave, as clearly shown in Fig. 1, and coacting with the commutators are brushes $n^2$, which may be of the usual or any preferred construction.

In the form of embodiment shown in Fig. 2 the driving member is shown as a gear-wheel $o$, and the opposed faces of the armature and the magnet are conical.

In the form of embodiment shown in Fig. 3 the magnet is shown as double—that is to say, is provided with two helices and with two friction-rings $g$, the armature being also provided with two friction-rings $c$.

In each form of embodiment of the invention herein shown the air-gap between the armature and magnet is maintained, and therefore the objects of the invention are attained in every instance.

The arrangements herein illustrated have been found to be thoroughly efficient in operation; but it will be apparent (and this right is reserved) that various changes may be resorted to and still be within the scope of the invention.

Having thus fully described the invention, what is claimed is—

1. A device of the class described comprising a driving member constituting a magnet, a driven member constituting an armature, non-magnetic friction-rings carried by each of the members, and means for energizing the magnet, said friction-rings being so proportioned as to maintain an air-gap between the driving and driven members.

2. A device of the class described comprising a driving member constituting an annular magnet, a shaft, an armature rigid with the shaft, non-magnetic friction-rings carried by the armature and by the magnet, and commutators also carried by the magnet, the friction-rings being so proportioned as to maintain an air-gap between the driving and driven parts.

3. A device of the class described, comprising a driving member constituting a magnet, a driven member constituting an armature, non-magnetic friction-rings carried by said members, commutators carried by the magnet, and means for energizing the magnet, the friction-rings being proportioned to maintain an air-gap between the driving and driven members.

In testimony whereof we have hereunto set our hands in the presence of two subscribing witnesses.

WENZEL SCHUSTER.
HEINRICH AST.

Witnesses:
JOSEF RUBASCH,
ALVESTO S. HOGUE.